May 28, 1957
W. C. HUTTON
2,793,783
PIPE SEALING DEVICE
Filed July 14, 1955
2 Sheets-Sheet 1
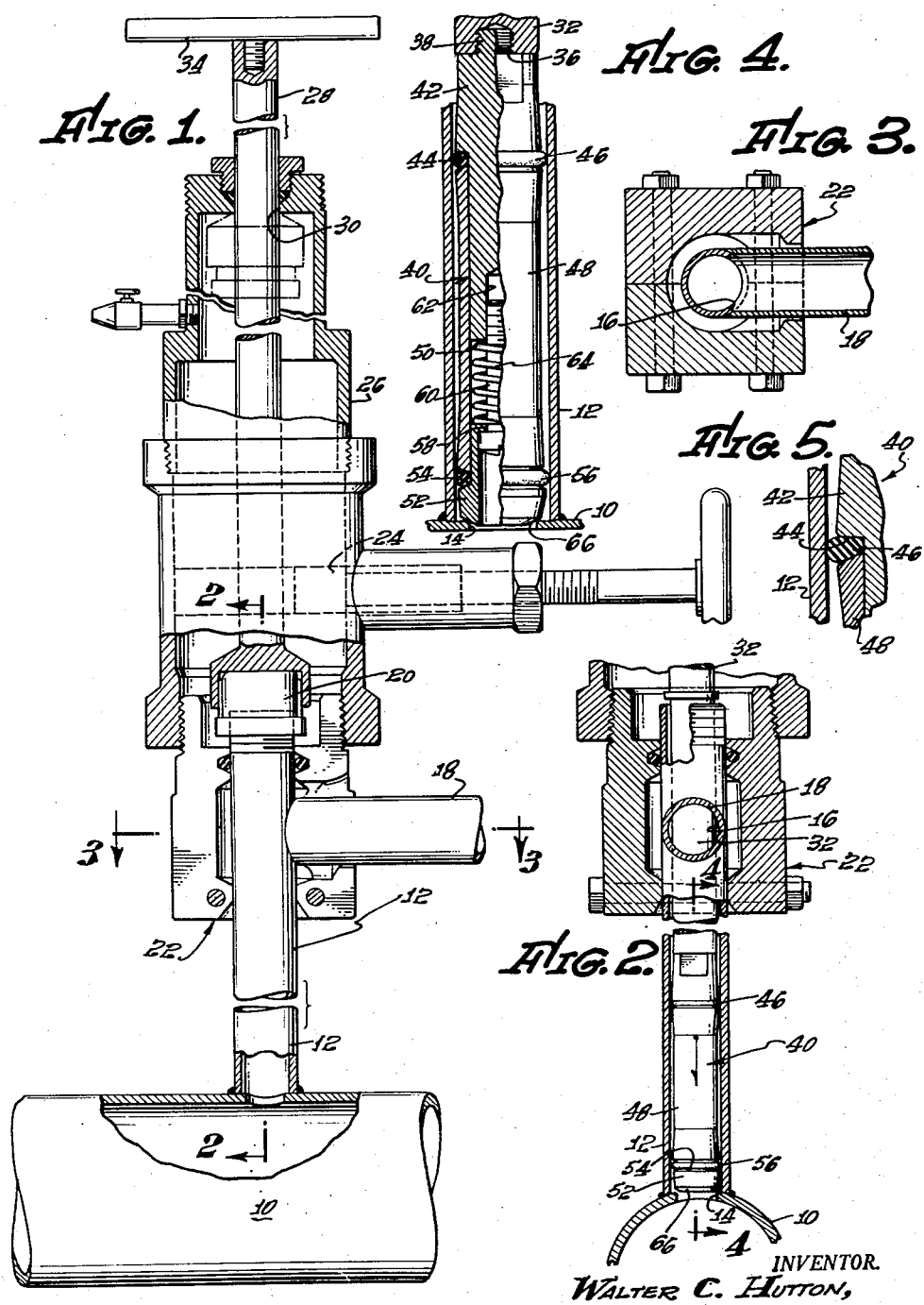
INVENTOR.
WALTER C. HUTTON, May 28, 1957 W. C. HUTTON 2,793,783
PIPE SEALING DEVICE
Filed July 14, 1955 2 Sheets-Sheet 2
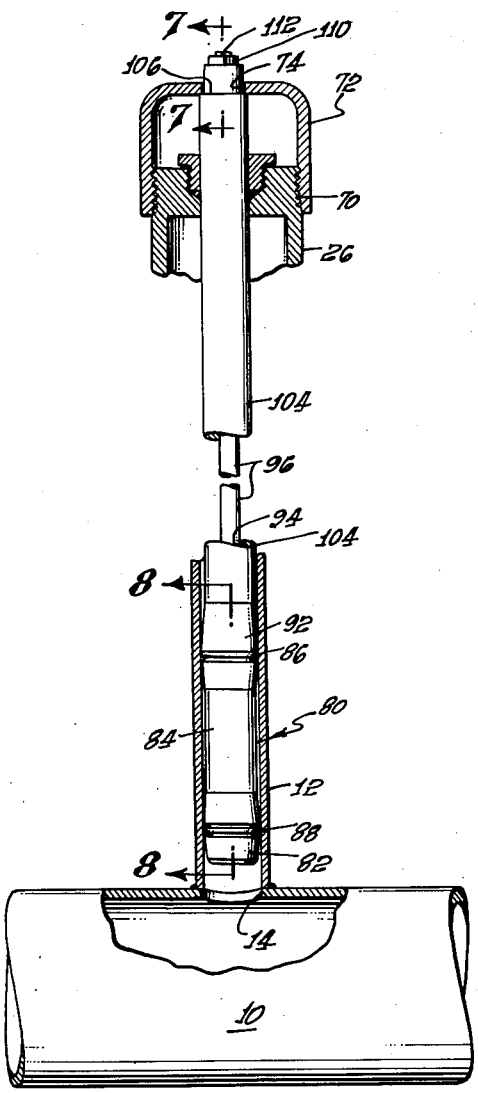
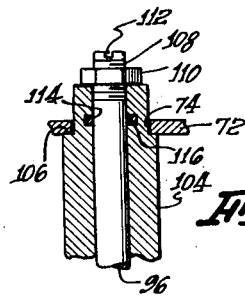
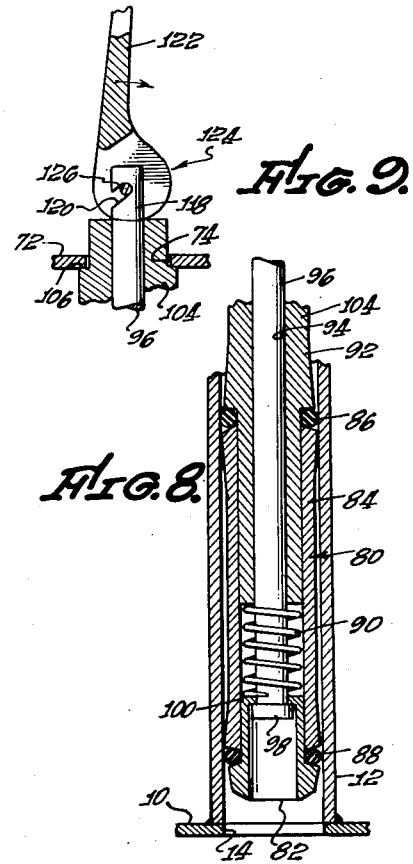
Walter C. Hutton,
INVENTOR.

United States Patent Office 2,793,783
Patented May 28, 1957

2,793,783

PIPE SEALING DEVICE

Walter C. Hutton, Los Angeles, Calif.

Application July 14, 1955, Serial No. 522,094

6 Claims. (Cl. 220—24.5)

The invention relates to a new and improved pipe sealing device.

In the copending application entitled Pressure Control Valve Means for Gas Mains and the Like, Serial No. 497,492 filed March 29, 1955, apparatus is shown for use in controlling the flow of gas from a high pressure main or pipe through a nipple into a service pipe or lateral during the performance of various tasks. The apparatus set forth in this copending application is considered to be basically very sound and has demonstrated in use its efficiency for the purpose intended. However, there are a number of cases in which apparatus such as is set forth in the copending case does not function satisfactorily because of the nature of the opening leading from the high pressure pipe or main into a nipple. Such openings are frequently created by a number of different procedures. One very common type of procedure involves first burning a hole in the wall of a main and then welding a nipple to the main surrounding the hole. Usually when this is done a very irregularly shaped surface remains, or at times no surface at all remains at the junction of the nipple and the high pressure main. Without a regularly formed surface or junction where the nipple is attached to the high pressure main, completely satisfactory results cannot be obtained utilizing the apparatus set forth in the copending application noted above.

It is an object of the present invention to provide a new and improved type pipe sealing device which may be utilized so as to seal virtually any pipe fitting having an internal shape of generally cylindrical configuration. A more specific object of the invention is to provide pipe sealing devices which are specifically designed to be utilized with a valve member, a gate valve, and a chambered body as described in the aforesaid copending application, which pipe sealing devices do not depend for their operation upon the existence of a regularly shaped edge formed within the confines of a nipple at the point of juncture of the nipple to a high pressure main. Further objects of the invention are to provide devices of the class described which are exceedingly reliable in use; which are relatively easy and convenient to employ; and which may be easily manufactured.

Further objects of this invention as well as the precise nature of it will be more fully apparent from the remainder of this description including the appended claims and the accompanying drawings, in which:

Fig. 1 is a side elevational view, partially in section, of a combination of fittings and various means utilized with the present invention;

Fig. 2 is a cross sectional view taken at line 2—2 of Fig. 1 of the drawings in which part of the structure illustrated is shown in elevation, showing a pipe sealing device of the present invention in use;

Fig. 3 is a cross sectional view taken at line 3—3 of Fig. 1;

Fig. 4 is a cross sectional view taken at line 4—4 of Fig. 2 of the drawings illustrating certain parts of the sealing device of this invention in elevation;

Fig. 5 is an enlarged detailed cross sectional view illustrating the operation of part of the sealing device shown in Figs. 2 and 4;

Fig. 6 is a view similar to Fig. 1 of a modified pipe sealing device of the invention and control means used therewith;

Fig. 7 is a cross sectional view taken at line 7—7 of Fig. 6;

Fig. 8 is a cross sectional view taken at line 8—8 of Fig. 6; and

Fig. 9 is a view similar to Fig. 7 illustrating a modified control means which can be employed with this modification of the invention.

In all figures of the drawings, like numerals are used to designate like parts whenever convenient for purposes of illustration and explanation. Those skilled in the art will realize from a consideration of these drawings that the various parts illustrated are not drawn to any precise scale representing a commercial embodiment of the invention, but instead are drawn to primarily illustrate and make clear the essential features of a preferred embodiment of this invention.

The actual inventive concept in back of this invention is considered to be defined in detail by the appended claims forming a part of this disclosure. However, this inventive concept may be briefly summarized as required by the Rules of Practice of the United States Patent Office as involving a pipe sealing device which includes: a center cylinder having an end and an annular shoulder formed thereon, said shoulder being spaced over said end; an elastomeric ring positioned around said center cylinder against said annular shoulder; a sleeve positioned around said center shoulder against said elastomeric ring; said sleeve projecting beyond said end of said center cylinder and being movable upon said center cylinder; an end cylinder positioned within said sleeve so as to be remote from said center cylinder, said end cylinder including an annular shoulder formed thereon adjacent to said sleeve, said end cylinder being movable within said sleeve; a second elastomeric ring positioned around said end cylinder against said annular shoulder between said annular shoulder and said sleeve; spring means placed within said sleeve between said center cylinder and said end cylinder, said spring normally urging said end cylinder and said center cylinder away from one another; and means limiting movement of said center cylinder away from said end cylinder.

A summary of this category is not considered to really indicate to anyone the true nature of an invention. To understand this invention in detail it is considered necessary to refer back to a structure such as is shown and described in the aforesaid copending application. For convenience of explanation, a structure of this category is reproduced as Fig. 1 of the drawings.

Here a high pressure main 10 used to convey fluid such as gas is shown having attached to the side thereof a nipple 12. A small opening 14 is located in the periphery of the high pressure main generally within the confines of the nipple 12 for the obvious purpose of allowing a fluid to go from this main into a nipple. A similar opening 16 is provided in the nipple 12 so as to allow this fluid to flow from the nipple into a service pipe or lateral 18. The nipple 12 is provided with an end cap 20; the nipple 12, the lateral 18, and the main 10 are normally buried beneath the ground.

When it becomes necessary to check the lateral 18 or to attach various equipment to it, what may be termed a valve member 22 such as is described in the aforesaid application is disposed about the nipple 12 and the lateral 18. Then a common gate valve 24 is attached to this valve member 22. A chambered member 26 is then in turn attached to the gate valve 24 so that a control rod 28 projecting through an opening 30 in the chambered member 26 can be moved through the gate valve 24 into engagement with the cap 20 so as to remove this cap 20 from the position shown back into the chambered member 26. After this has been done, the escape of fluid under pressure from the high pressure main 10 is prevented by the gate valve 24 being closed. After it has been so closed the chambered member 26 can be removed from this gate valve and the cap 20 can be removed from the control rod 28.

Preferably with the invention this control rod 28 is then replaced by another control rod 32 projecting through the opening 30 in the chambered member 26. This other control rod preferably is provided with a handle such as the handle 34 on the control rod 28. The end of the control rod 32 fitting within the chambered member 26 is provided with an internally threaded bore 36 which is adapted to receive a threaded stud 38 on a pipe sealing device 40 of the present invention.

As is best seen in Figs. 2 and 4 of the drawings this pipe sealing device 40 includes a center cylinder 42 upon which the stud 38 is formed. On the outside of this center cylinder there is located an annular shoulder 44, against which there is positioned a common O ring 46 formed out of rubber, neoprene, or like elastomeric material. A sleeve 48 is positioned around the center cylinder 42 so as to be movable with respect to it and so as to project beyond the lower end 50 of it. The sleeve 48 normally abuts against the O ring 46 to a sufficient extent so as not to deform this O ring when the pipe sealing device 40 is not in use.

Within the end of the sleeve 48 removed from the center cylinder 42 there is located an end cylinder 52 having formed thereon an outer annular shoulder 54. Another O ring 56 is located around this end cylinder 52 against the annular shoulder 54 between it and the sleeve 48 in such a manner that the O ring 56 is also not distorted from its normal shape when the pipe sealing device 40 is not being used for the purpose intended. The end cylinder 52 is, with the construction shown, movable within the sleeve 48 in much the same manner in which the sleeve 48 is movable with respect to the center cylinder 42.

In order to limit the movement of the end cylinder 52 with respect to the center cylinder 42, an internal flange or collar 58 is provided within this end cylinder 52, and a common bolt 60 is passed through the end cylinder 52 so as to engage a threaded opening 62 in the lower end 50 of the center cylinder 42. A coil spring 64 is mounted under compression between the center cylinder 42 and the flange 58 so as to normally hold the center cylinder 42 away from the end cylinder 52.

Thus, when the gate valve 24 is opened and the control rod 32 is moved towards the main 10 so as to place the pipe sealing device 40 within the nipple 12 all of the parts of this pipe sealing device 40 are in essence spread apart and the O rings 46 and 56 are in their normal shape. As this motion continues a bevelled end 66 of the end cylinder 52 strikes on an internal shoulder 14 causing the end shoulder 12 to move against the pressure of the spring 64. By virtue of the construction shown, the bolt 60 and the center cylinder 42 will then, as the control rod 32 is further pushed in this direction, move towards the high pressure main 10 forcing the O ring 46 up against the sleeve 48. This sleeve 48 will also press against the O ring 56. During this operation the O rings 46 and 56 will be expanded to a configuration such as is indicated in Fig. 5 of the drawings, sealing the nipple against fluid leakage. These seals may be readily broken by withdrawing the pressure upon the control rod 32. When this is done, the pressure of the high pressure main 10 to the lateral 18 will be slowly let out or decreased. If desired, the seal may be readily reestablished at any time by merely pushing on the control rod 32. In order to prevent undesired binding of the sleeve 48 within the nipple 12 this sleeve preferably is formed with a tapered exterior surface as shown having a larger diameter at its end and a comparatively small diameter at its middle.

In Fig. 6 of the drawings a modified construction of the invention is shown which is designed to be utilized with a high pressure main 10 such as previously described and a nipple 12, a valve member 22, a gate valve 42, and a chambered member 26. With this modification of the invention, the chambered member is preferably provided with external threads 70 surrounding the opening 30 so that a cap 72 having a central opening 74 formed therein can be readily secured to this chambered member. A modified pipe sealing device 80 of the invention is employed which includes an end cylinder 82 of substantially the same construction as the end cylinder 52, a sleeve 84 similar to the sleeve 48, O rings 86 and 88 similar to the O rings 46 and 56, a spring 90 similar to the spring 64, and a center cylinder 92 which differs from them center cylinder 42 previously described in that it is provided with a center passage 94 which is adapted to hold an elongated rod 96 having a head 98 formed thereon so as to engage a flange or collar 100 similar to the collar 58 previously described. Also attached to the center cylinder 92 is an elongated shaft 104 which may, if desired, be formed as part of the center cylinder 92 as shown.

This shaft 104 projects through the valve member 22 of gate valve 24 and the chambered member 26 through the opening 30 into a space between the cap 72 and the chambered member 26. It is provided with an end groove or flange 106 which fits against the cap 72 substantially as shown so that movement of the shaft 104 exteriorly of the chambered member 26 is prevented. The end 108 of the rod 96 remote from the modified pipe sealing device 80 is threaded, and projects through the shaft 104 and the center cylinder 92 so as to receive a common nut 110 which may be adjusted in order to fix the position of this rod 96 and the end cylinder 82. A groove 112 is provided in this end 108 so that the position of this rod, the end cylinder 82, the sleeve 84, may be regulated by a screw driver or like tool with respect to the center cylinder 92 in order to expand the O rings 86 and 88 into engagement with the nipple 12 in order to accomplish the sealing action. This sealing action and the release of it is substantially the same as that described with respect to the pipe sealing device 40 and should be obvious to even those substantially unfamiliar with the art to which this invention pertains. A groove 114 is located within the shaft 104 so as to hold an O ring 116 against the rod 96 in order to prevent leakage.

If desired, the end 108 of the rod 96 can be replaced by another end 118 having formed therein a slanted slot 120 so that a wrench 122 having a cam end 124 and a pin 126 projecting adjacent this cam end may be placed with the pin 126 in engagement with the slot 120. Then the wrench may be turned in the direction of the arrow shown, causing the cam end 124 to move pulling the rod 96 in an upward direction as shown accomplishing the sealing action previously described.

It is possible to utilize the broad principles of the present invention in providing a sealing structure in which a single O ring is utilized and expanded. As an example of this only one of the cylinders specified in the preceding need be employed with a single sleeve. Thus, for example, in the construction shown in Fig. 8 of the drawings, it is possible to omit the upper O ring 86 and, if desired, form the sleeve 84 as an integral part of the shaft 104. Constructions of this category are not preferred with the invention, however, inasmuch as in known applications a double sealing as indicated in the preceding discussion is necessary so as to achieve effective results, perhaps because of surface irregularities. The devices shown herein are very satisfactory in simultaneously expanding two different O rings so as to prevent any possibility of fluid leakage.

Those skilled in the art to which this invention pertains will realize that a large number of different modifications of the invention are possible without departing from the essential features of the invention. All such modifications are to be considered as part of the inventive concept insofar as they are defined by the appended claims, and are within the ability of a skilled mechanic in the art to which this invention pertains.

I claim:
1. A device of the class described which includes: a center cylinder having an end and an annular shoulder formed thereon, said shoulder being spaced from said end; an elastomeric ring positioned around said center cylinder against said annular shoulder; a sleeve positioned around said center cylinder against said elastomeric ring, said sleeve projecting beyond said end of said center cylinder; and end cylinder positioned within said sleeve remote from said center cylinder, said end cylinder including an annular shoulder formed thereon; a second elastomeric ring positioned around said end cylinder between said annular shoulder on said end cylinder and said sleeve; and spring means placed between said end cylinder and said center cylinder within said sleeve.

2. A device as defined in claim 1 wherein: said elastomeric rings are O rings.

3. A device as defined in claim 1 wherein: said sleeve is provided with a tapered outer surface so as to have ends of larger diameter than the diameter of the center of said sleeve.

4. A device of the class described which includes: a center cylinder having an end and an annular shoulder formed thereon, said shoulder being spaced from said end; an elastomeric ring positioned around said center cylinder against said annular shoulder; a sleeve positioned around said center cylinder against the elastomeric ring, said sleeve projecting beyond said end of said center cylinder, said sleeve being slidably located upon said center cylinder; an end cylinder slidably positioned within said sleeve so as to project beyond the end of said sleeve remote from said center cylinder, said end cylinder including an annular shoulder formed thereon; a second elastomeric ring positioned around said end cylinder between said annular shoulder on said end cylinder and said sleeve; spring means placed between said end cylinder and said center cylinder within said sleeve, said spring means normally urging said end cylinder away from said center cylinder; means mounted on said center cylinder for limiting movement of said end cylinder away from said center cylinder, said end cylinder being movable towards said center cylinder against the pressure of said spring means whereby as said end cylinder is moved towards said center cylinder, said sleeve slides upon said end cylinder and said center cylinder and said elastomeric rings are expanded so as to project beyond said sleeve, said center cylinder and said end cylinder.

5. A device of the class described which includes: a center cylinder having an end and an annular shoulder formed thereon, said shoulder being spaced from said end; means defining an opening leading through said center cylinder; an elastomeric ring positioned upon said center cylinder against said annular shoulder; a sleeve positioned around said center cylinder against said elastomeric ring, said sleeve projecting beyond said end of said center cylinder; an end cylinder positioned within said sleeve so as to project beyond the end of said sleeve remote from said center cylinder, said end cylinder including an annular shoulder formed thereon; a second elastomeric ring positioned around said end cylinder between said annular shoulder on said end cylinder and said sleeve; spring means placed between said end cylinder and said center cylinder within said sleeve, said spring means normally urging said end cylinder away from said center cylinder; a rod projecting through said opening in said center cylinder and through said sleeve, said rod engaging said end cylinder whereby said rod may be pulled against said spring means moving said end cylinder towards said center cylinder, resulting in said elastomeric rings being expanded so as to project beyond said sleeve, said center cylinder, and said end cylinder.

6. A device of the class described which includes: a center cylinder having an end and an annular shoulder formed thereon, said shoulder being spaced from said end; an elastomeric ring positioned around said center cylinder against said annular shoulder; a sleeve positioned around said center cylinder against said elastomeric ring, said sleeve projecting beyond said end of said center cylinder; a rod extending through said cylinder and said sleeve; means for holding an elastomeric ring against the end of said sleeve remote from said center cylinder, said means being located within the end of said sleeve remote from center cylinder so as to extend from said sleeve and being operatively secured to said rod so as to be actuated thereby; a second elastomeric ring positioned on said means for holding so as to be located adjacent to said end of said sleeve remote from said center cylinder; and spring means located between said center cylinder and said means for holding.

References Cited in the file of this patent

UNITED STATES PATENTS

| | | |
|---|---|---|
| 543,745 | Meyer | July 30, 1895 |
| 1,050,557 | McLaughlin | Jan. 14, 1913 |
| 1,185,116 | Mack | May 30, 1916 |
| 1,446,223 | Thompson et al. | Feb. 20, 1923 |
| 1,993,307 | Nicholson | Mar. 5, 1935 |
| 1,997,878 | Wagner | Apr. 16, 1935 |
| 2,661,762 | Bryant | Dec. 8, 1953 |